Nov. 21, 1961  R. D. ANDERSON  3,009,380
FASTENER WITH SPRING ARMS AND RETRACTING MEANS
Filed Feb. 13, 1958
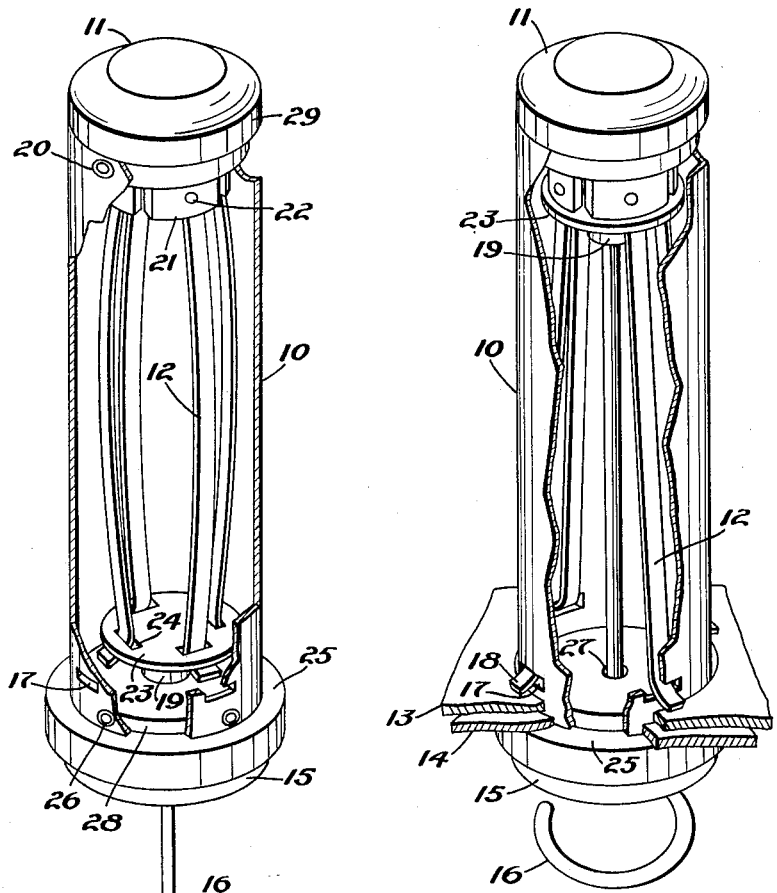
FIG- 2
FIG- 1
INVENTOR.
RUSSELL D. ANDERSON
BY 
ATTORNEY United States Patent Office 3,009,380
Patented Nov. 21, 1961

3,009,380
FASTENER WITH SPRING ARMS AND
RETRACTING MEANS
Russell D. Anderson, Ames, Iowa, assignor to Collins Radio Company, Cedar Rapids, Iowa, a corporation of Iowa
Filed Feb. 13, 1958, Ser. No. 715,847
2 Claims. (Cl. 85—5)

This invention relates generally to plate fasteners and more particularly to a self-locking coupling pin device useful for loosely coupling two or more flat plates.

Numerous coupling pins and clamping devices known in the art include some type of locking device wherein the pin is useful for fastening together plates or in coupling operations, such as clevis pin applications. Such devices generally require either a special tool for insertion and removal or are so constructed that both hands are required for putting the pin in place, or in some other manner necessitate a multi-step operation for insertion and removal. Ofttimes, a self-locking pin is desired which may be rapidly inserted and locked and rapidly unlocked and withdrawn with a minimum of complication. Ideally, a simple one-step operation might include the insertion of a plunger for assembly wherein in one simple maneuver the pin may be put in place and locked in place. Such a device would be useful in the rapid assembly of plate-like structures, such as might be useful in military applications wherein time for assembly must necessarily be cut to a minimum.

It is an object of this invention, therefore, to provide a plate fastener in the form of a clevis-pin type of device which may be unlocked and withdrawn and/or inserted and locked with but a single uninterrupted motion.

It is a further object of this invention to provide a self-locking coupling pin of unique spring-lock construction in which the pressure which may be exerted against the plate-confining elements is not limited by a spring-retaining force, as in spring-loaded fasteners now generally in use.

A still further object of this invention is to provide a spring-actuated locking device in which the spring elements remain in the normal unbiased and undistorted condition during the in-place and locked position of the pin.

This invention is featured in the utilization of the entire pin diameter as the retaining element by placing within the pin body a plurality of spring-finger elements, one end of the spring-finger elements being firmly anchored, and the free ends, when the spring elements are undistorted, protruding through openings in the pin body to lock the pin in place.

These and other objects and features of the invention will become apparent from the following description and claims when read in conjunction with the drawings, in which:

FIGURE 1 is a perspective view of the locking pin of the invention with the spring elements distorted such that the pin may be inserted.

FIGURE 2 is a perspective view of the pin showing the pin in place and locked.

With reference to FIGURE 1, the device is seen to be comprised of a hollow cylindrical body member 10 containing therein four spring-finger elements 12. Each of said spring elements is a substantially flat spring member having one end firmly anchored in a spring mounting means 21. Spring mounting means 21 might, as illustrated, consist of slots formed in a portion of a cap member 11 which closes one end of cylinder 10. Each of the spring elements 12 might then be inserted in a slot and firmly anchored in a position by means of a retaining pin 22. Cap member 11 has reduced diameter portion 29, as illustrated, which permits insertion of the cap 11 in the cylinder 10 to be retained by a plurality of pins or rivets 20. It is to be understood, of course, that the exact means of fastening cap 11 and the particular construction thereof is not to be limited to that illustrated in the drawings. It is important, however, that the spring-finger mounting means 21 be so arranged that the spring elements 12 are anchored at points radially inward from the hollow cylindrical body member 10.

The other end of body member 10 is capped by a member 15 which is constructed with a reduced diameter portion 28 which may be inserted into cylinder 10 and secured by means of a plurality of pins 26. With reference now to FIGURE 2, body member 10 is seen to have formed therein a plurality of through-holes 17 circumferentially disposed such that one through-hole aligns with the free end 18 of a spring-finger element 12. FIGURE 2 illustrates the pin in its inserted, locked position and it is noted that each of the spring-finger elements 12 is straight, that is, in an undistorted and normal position. The free ends 18 are formed outwardly so as to pass through the openings 17 in body member 10 and thus prevent the assembly from being withdrawn. It is seen from FIGURE 2 that the body member 10 cannot be withdrawn from the two coupled plates 13 and 14 since the application of any downward force on body member 10 would only tend to spread the spring-finger elements 12 further and thus increase the retaining force. No spring-retaining force is utilized to form the lock, but rather a wedge-like action provides a positive lock wherein the pin structure cannot be forced back out through the plates nor can it be vibrated loose. The coupled plates 13 and 14 are confined by the turned-out ends 18 of the spring elements 12 and the collar portion 25 formed on cap member 15.

To facilitate insertion and removal of the device, a spring-distorting means is employed to compress the springs inwardly to withdraw the free ends 18 from their locking positions through the openings 17 in body member 10. This spring-distorting action is accomplished by means of a spring-distorting plate 23 (see FIGURE 1). Spring-distorting plate 23 is formed with a plurality of openings 24 through which the spring-finger elements 12 are slidably received. The placement of the openings 24 in spring-distorting plate 23 is such that with the plate 23 in its fully inserted position, such as illustrated in FIGURE 2, no distorting force is placed on the spring elements 12, that is, the openings 24 and the plate 23 substantially align themselves with the mounting radius of the springs 12. Spring-distorting plate 23 is formed with a collar member 19 into which a plunger 16 is received and firmly anchored. With reference to FIGURE 2, plunger 16 is slidably received through an axial opening 27 formed through cap member 15. With the construction illustrated and described, it is seen that from the inserted and locked position of the coupling device of this invention as shown in FIGURE 2, the coupling device may be rapidly unlocked and withdrawn from plates 13 and 14 with but a single uninterrupted downward force on plunger 16 to the plunger position illustrated in FIGURE 1. As plunger 16 pulls spring-distorting plate 23 away from the spring mounting 21, the spring elements 12 are distorted such that the free ends 18 are drawn radially inwardly. Until the ends 18 are withdrawn through the openings 17 in body member 10, the entire structure is restrained and remains in place. However, it becomes apparent that as the ends 18 of springs 12 are withdrawn sufficiently to become substantially flush with the outer surface of cylinder 10, the entire pin body and structure becomes unrestrained and may be moved by a continuation of the downward axial force being inserted on plunger 16.

Now with the pin removed and unlocked with plunger 16 withdrawn, as illustrated in FIGURE 1, it is seen that the insertion and locking of the device in plates 13 and 14 may be accomplished rapidly and simply by a continuous uninterrupted force being applied upwardly on plunger 16. As the pin is inserted, the restraining face 25 on cap 15 first engages the lower plate 14 and thus halts the upward motion of the body member 10 while a continued upward movement of plunger 16 then forces spring-distorting plate 23 inwardly towards spring-mounting means 21 which removes the confining bias on spring-finger elements 12 and allows the elements to assume their normal unbiased position with the free ends 18 protruding through the openings 17 in body member 10.

From the structure described, it is seen that by this invention a self-locking plate fastener or clevis pin arrangement has been achieved which by unique construction provides a coupling pin, the insertion and removal of which is extremely simple, requiring but a single uninterrupted force application. The device is seen in its inserted and locked position to be vibration-proof since a definite force application on plunger 16 is necessary to effect sufficient spring distortion to remove the lock. It can be further seen with respect to FIGURE 1 that with the plunger 16 withdrawn and the device in its unlocked position the structure still allows a substantial vibration-free condition. When the spring-distorting plate 23 is in its distorting position as illustrated in FIGURE 1, spring-finger elements 12 actually attain a bowed shape such that the plunger is in a quasi-locked position. Sufficient force must be applied to plunger 16 to overcome the restraining friction placed on distorting plate 23 by the outwardly bowed position of spring-finger elements 12.

Although this invention has been described with respect to a particular embodiment thereof, it is not to be so limited as changes and modifications may be made therein which are within the full intended scope of the invention as defined by the appended claims.

What is claimed is:

1. A plate fastener comprising a hollow body member, a spring securing member rigidly affixed to one end of said body member, a plurality of spring members having first ends thereof anchored in said securing member at points radially inward from the inside wall of said hollow body member, said spring members extending longitudinally within said body member, the second ends of said spring members being angled outwardly from the longitudinal axis of said body member, a plurality of through openings formed in said body member, the second ends of said spring members receivable in said through openings, a spring deforming plate member slidably engageable with each of said spring members, said spring deforming plate formed with a plurality of openings therethrough each slidably receiving one of said spring members, said plurality of plate openings being radially disposed from the longitudinal axis of said body member by a distance substantially equal that of the anchored first ends of said spring members, a flanged cap member rigidly affixed within the remaining end of said body member, a plunger rod slidably receivable through said cap member and rigidly affixed to said spring deforming plate member, a first inserted position of said plunger rod positioning said spring deforming plate such that said spring members are unbiased, with the free ends thereof received in said body member through openings and a second retracted position of said plunger rod positioning said spring deforming plate to bias said spring members radially inward to withdraw said second ends thereof from said through-holes in said body member.

2. Means for loosely coupling flat plates comprising a hollow cylindrical body member, a plate bearing surface terminating one end of said body member and radially extending about one end thereof, spring mounting means fixed in the other end of said body member and providing a spring mounting diameter less than that of said body member, a plurality of flat leaf spring members having first ends rigidly affixed in said mounting means, a plurality of through-holes circumferentially disposed about said body member at a point space separated from said plate bearing surface by a distance substantially equal to the thickness of said flat plates, each of said plurality of spring members extending angularly outward from said mounting means to said body member through-holes, the free end of each spring member turned outwardly from the longitudinal axis of said body member and receivable through one of said through-holes with the end extending beyond the outside surface of said body member, a spring distorting means comprising a plate having a plurality of openings formed therethrough, each said plate opening slidably receiving one of said springs, said plate openings being radially displaced from the longitudinal axis of said body member by a distance substantially equal to one-half of said mounting diameter of said spring mounting means, and a rod-like member extending coaxially within said body member and affixed to said spring distorting plate, whereby withdrawal of said rod from said body member distorts said springs inwardly to draw the free ends thereof out of said body member through-holes, and insertion of said rod into said body member permits said spring members to assume an undistorted position with the free ends thereof extending through said body member.

References Cited in the file of this patent

UNITED STATES PATENTS

| | | |
|---|---|---|
| 543,432 | Thompson et al. | July 23, 1895 |
| 571,361 | Suerard | Nov. 17, 1896 |
| 1,421,768 | Egbert et al. | July 4, 1922 |
| 1,478,093 | Ballaz | Dec. 18, 1923 |
| 1,528,946 | Pilcher et al. | Mar. 10, 1925 |
| 2,720,834 | Davis | Oct. 18, 1955 |

FOREIGN PATENTS

| | | |
|---|---|---|
| 496,728 | France | Aug. 13, 1919 |